(12) United States Patent  
Durham et al.

(10) Patent No.: US 8,666,542 B2
(45) Date of Patent: Mar. 4, 2014

(54) MULTI-CHANNEL CONTROLLER (75) Inventors: Charles Edward Maloy Durham, Acworth, GA (US); Michael C. Finley, Roswell, GA (US); Bisser G. Paskalev, Alpharetta, GA (US); Jason T. Pastor, Canton, GA (US)

(73) Assignee: NCR Corporation, Duluth, GA (US)

( * ) Notice: Subject to any disclaimer, the term of this patent is extended or adjusted under 35 U.S.C. 154(b) by 1312 days.

(21) Appl. No.: 12/165,491

(22) Filed: Jun. 30, 2008

(65) Prior Publication Data

US 2009/0004024 A1  Jan. 1, 2009

Related U.S. Application Data (60) Provisional application No. 60/947,238, filed on Jun. 29, 2007.

(51) Int. Cl.
*G06F 17/00* (2006.01)

(52) U.S. Cl.
USPC .................. 700/241; 700/236; 700/244

(58) Field of Classification Search
USPC .................... 700/241, 244, 19, 236
See application file for complete search history.

(56) References Cited

U.S. PATENT DOCUMENTS

| 4,525,789 | A * | 6/1985 | Kemper et al. ............... 370/249 |
| 6,052,629 | A * | 4/2000 | Leatherman et al. ......... 700/241 |
| 7,020,494 | B2 | 3/2006 | Spriestersbach .............. 455/566 |
| 7,526,294 | B2 * | 4/2009 | Pfleging et al. .......... 340/995.12 |
| 7,684,875 | B2 * | 3/2010 | Jundt et al. ....................... 700/19 |
| 7,778,185 | B2 * | 8/2010 | Kollner et al. ................ 370/241 |
| 2002/0143638 | A1 | 10/2002 | August ............................ 705/26 |
| 2003/0148775 | A1 | 8/2003 | Spriestersbach .............. 455/456 |
| 2004/0008679 | A1 | 1/2004 | Sinnarajah ..................... 370/390 |
| 2004/0095112 | A1 | 5/2004 | Kernahan ...................... 323/282 |
| 2004/0171381 | A1 | 9/2004 | Inselberg ................... 455/426.2 |
| 2004/0193707 | A1 | 9/2004 | Alam ............................. 709/223 |
| 2004/0249497 | A1 | 12/2004 | Saigh ............................. 700/216 |
| 2005/0288035 | A1 | 12/2005 | Wang ......................... 455/456.1 |
| 2007/0119859 | A1 * | 5/2007 | Harrell ............................. 222/52 |
| 2009/0004024 | A1 * | 1/2009 | Durham et al. .................... 417/2 |

OTHER PUBLICATIONS

International Search Report and Written Opinion for PCT/US2008/008138 date mailed Sep. 24, 2008.
"FABS Pocket PC OrderPad Demonstration Software," Mar. 10, 2004, 4 pages of 33.
Press Release: "ActSoft Releases New GPS Tracking Software With Integrated Order Entry and Dispatch; Comet Tracker Utilizes GPS-Enabled Mobile Phones for Time, Task, and Worker Location Tracking," PR Newswire Apr. 6, 2004, 1 page.
Bean, Russell, "Systems for any situation," Restaurant Business, vol. 104, Issue 16, Dec. 2005, p. 74.

\* cited by examiner

*Primary Examiner* — Timothy Waggoner
(74) *Attorney, Agent, or Firm* — Dana T. Hustins; Kevin P. Belote (57) ABSTRACT

One aspect of the present invention provides a multi-channel controller that can control a plurality of fuel pump devices, with each fuel pump device having its own dedicated communications channel. Accordingly, aspects of the present invention enable existing wiring and fuel pump devices to be preserved while turning an existing fuel pump device installation into a network of may point-to-point networks.

40 Claims, 6 Drawing Sheets

MULTI-CHANNEL CONTROLLER

CROSS REFERENCE TO RELATED APPLICATIONS

This application claims priority to U.S. Provisional Application Ser. No. 60/947,238 entitled "Multi-Channel Controller", filed on Jun. 29, 2007, which is herein incorporated by reference in its entirety.

BACKGROUND OF THE INVENTION

A large installed base of fuel dispensing networks and devices function in multi-drop Current Loop or RS485 networks. Such networks have a number of faults, such as bandwidth limitations due to fixed data rates divided among many devices and the half-duplex nature of two-wire versions of conventional communication protocols. Conventional fuel dispensing networks are also subject to unreliability when connections break or are polluted with out-of-spec signals from other devices or from errors induced by stray electromagnetic (EM) radiation. Data security is also less than optimal because data traveling over conventional fuel dispensing networks is subject to taps at numerous points. Finally, it can be difficult to diagnose problems with conventional fuel dispensing devices and networks because of an uncertainty about the source of errors or the addressing of fuel pump devices.

Digital transmission mediums, such as wired Ethernet, can provide solutions to some of the aforementioned problems. Digital transmission equipment, however, can be too expensive to purchase and deploy for owners of new fuel dispensing installations. Further, the costs of replacing an existing installation of conventional fuel dispensing devices with digital devices can be prohibitive. Accordingly, there is a need in the art for systems, methods, and computer program products that can address the deficiencies of conventional fuel dispensing devices and networks while allowing for the continued use of conventional fuel dispensing equipment.

SUMMARY OF THE INVENTION

One embodiment of the present invention provides a method for using a controller to control a plurality of fuel pump devices that are connected to the controller over a plurality of dedicated channels. First, a message sent from a remote device to the controller over a first connection is received. Second, a first fuel pump device is determined from among the plurality of fuel pump devices to which to send the message. Third, a first dedicated channel is determined from among the plurality of dedicated channels over which to send the message to the first fuel pump device. Finally, the message is communicated from the controller to the first fuel pump device over the first dedicated channel.

Another embodiment of the present invention provides an apparatus comprising a processor programmed to perform a method for using a controller to control a plurality of fuel pump devices that are connected to the controller over a plurality of dedicated channels. First, a message sent from a remote device to the controller over a first connection is received. Second, a first fuel pump device is determined from among the plurality of fuel pump devices to which to send the message. Third, a first dedicated channel is determined from among the plurality of dedicated channels over which to send the message to the first fuel pump device. Finally, the message is communicated from the controller to the first fuel pump device over the first dedicated channel.

A further embodiment of the present invention provides a computer program product encoded in a computer readable medium, the program product comprising instructions for using a controller to control a plurality of fuel pump devices that are connected to the controller over a plurality of dedicated channels. First, a message sent from a remote device to the controller over a first connection is received. Second, a first fuel pump device is determined from among the plurality of fuel pump devices to which to send the message. Third, a first dedicated channel is determined from among the plurality of dedicated channels over which to send the message to the first fuel pump device. Finally, the message is communicated from the controller to the first fuel pump device over the first dedicated channel.

Another embodiment of the present invention provides a method for using a controller to control a plurality of fuel pump devices that are connected to the controller over a plurality of dedicated channels. First, a message sent from a remote device to the controller is received over a first connection. Second, the message is used to select a first fuel pump device from among the plurality of fuel pump devices. Third, the message is used to select a first dedicated channel from among the plurality of dedicated channels over which to communicate the message to the first fuel pump device. Fourth, at least a part of the message is communicated from the controller to the first fuel pump device over the first dedicated channel.

Yet another embodiment of the present invention provides an apparatus comprising a processor programmed to perform a method for using a controller to control a plurality of fuel pump devices that are connected to the controller over a plurality of dedicated channels. First, a message sent from a remote device to the controller is received over a first connection. Second, the message is used to select a first fuel pump device from among the plurality of fuel pump devices. Third, the message is used to select a first dedicated channel from among the plurality of dedicated channels over which to communicate the message to the first fuel pump device. Fourth, at least a part of the message is communicated from the controller to the first fuel pump device over the first dedicated channel.

A further embodiment of the present invention provides a computer program product encoded in a computer readable medium, the program product comprising instructions for using a controller to control a plurality of fuel pump devices that are connected to the controller over a plurality of dedicated channels. First, a message sent from a remote device to the controller is received over a first connection. Second, the message is used to select a first fuel pump device from among the plurality of fuel pump devices. Third, the message is used to select a first dedicated channel from among the plurality of dedicated channels over which to communicate the message to the first fuel pump device. Fourth, at least a part of the message is communicated from the controller to the first fuel pump device over the first dedicated channel.

A further embodiment of the present invention provides a method for using a controller to control a plurality of fuel pump devices that are connected to the controller over a plurality of dedicated channels. First, a message sent from a remote device to the controller over a first connection is received. Second, the message is used to select a first fuel pump device from among the plurality of fuel pump devices. Third, the message is used to select a first dedicated channel from among the plurality of dedicated channels over which to communicate with the first fuel pump device. Fourth, the message is translated into a command for the first fuel pump device. Finally, the command is communicated from the controller to the first fuel pump device over the first dedicated channel.

Another embodiment of the present invention provides an apparatus comprising a processor programmed to perform a method for using a controller to control a plurality of fuel pump devices that are connected to the controller over a plurality of dedicated channels. First, a message sent from a remote device to the controller over a first connection is received. Second, the message is used to select a first fuel pump device from among the plurality of fuel pump devices. Third, the message is used to select a first dedicated channel from among the plurality of dedicated channels over which to communicate with the first fuel pump device. Fourth, the message is translated into a command for the first fuel pump device. Finally, the command is communicated from the controller to the first fuel pump device over the first dedicated channel.

A further embodiment of the present invention provides a computer program product encoded in a computer readable medium, the program product comprising instructions for using a controller to control a plurality of fuel pump devices that are connected to the controller over a plurality of dedicated channels. First, a message sent from a remote device to the controller over a first connection is received. Second, the message is used to select a first fuel pump device from among the plurality of fuel pump devices. Third, the message is used to select a first dedicated channel from among the plurality of dedicated channels over which to communicate with the first fuel pump device. Fourth, the message is translated into a command for the first fuel pump device. Finally, the command is communicated from the controller to the first fuel pump device over the first dedicated channel.

Yet another embodiment of the present invention provides a method for using a controller to control a plurality of fuel pump devices that are connected to the controller over a plurality of dedicated channels. First, a first message and a second message sent from a remote device to the controller over a first connection are received. Second, the first message is used to select a first fuel pump device from among the plurality of fuel pump devices by mapping the first message to the first fuel pump device. Third, the second message is used to select a second fuel pump device from among the plurality of fuel pump devices by mapping the second message to the second fuel pump device, and then the first message is used to select a first dedicated channel from among the plurality of dedicated channels by mapping the first message to the first dedicated channel. Fifth, the second message is used to select a second dedicated channel from among the plurality of dedicated channels by mapping the second message to the second dedicated channel. The first message is then translated into a first command for the first fuel pump device and the second message is translated message into a second command for the second fuel pump device. The first command is communicated from the controller to the first fuel pump device over the first dedicated channel and the second command is communicated from the controller to the second fuel pump device over the second dedicated channel.

Another embodiment of the present invention provides an apparatus comprising a processor programmed to perform a method for using a controller to control a plurality of fuel pump devices that are connected to the controller over a plurality of dedicated channels. First, a first message and a second message sent from a remote device to the controller over a first connection are received. Second, the first message is used to select a first fuel pump device from among the plurality of fuel pump devices by mapping the first message to the first fuel pump device. Third, the second message is used to select a second fuel pump device from among the plurality of fuel pump devices by mapping the second message to the second fuel pump device, and then the first message is used to select a first dedicated channel from among the plurality of dedicated channels by mapping the first message to the first dedicated channel. Fifth, the second message is used to select a second dedicated channel from among the plurality of dedicated channels by mapping the second message to the second dedicated channel. The first message is then translated into a first command for the first fuel pump device and the second message is translated message into a second command for the second fuel pump device. The first command is communicated from the controller to the first fuel pump device over the first dedicated channel and the second command is communicated from the controller to the second fuel pump device over the second dedicated channel.

A further embodiment of the present invention provides a computer program product encoded in a computer readable medium, the program product comprising instructions for using a controller to control a plurality of fuel pump devices that are connected to the controller over a plurality of dedicated channels. First, a first message and a second message sent from a remote device to the controller over a first connection are received. Second, the first message is used to select a first fuel pump device from among the plurality of fuel pump devices by mapping the first message to the first fuel pump device. Third, the second message is used to select a second fuel pump device from among the plurality of fuel pump devices by mapping the second message to the second fuel pump device, and then the first message is used to select a first dedicated channel from among the plurality of dedicated channels by mapping the first message to the first dedicated channel. Fifth, the second message is used to select a second dedicated channel from among the plurality of dedicated channels by mapping the second message to the second dedicated channel. The first message is then translated into a first command for the first fuel pump device and the second message is translated message into a second command for the second fuel pump device. The first command is communicated from the controller to the first fuel pump device over the first dedicated channel and the second command is communicated from the controller to the second fuel pump device over the second dedicated channel.

A further embodiment of the present invention provides a method for using a controller to control a plurality of fuel pumps that are connected to the controller over a plurality of dedicated channels. First, the controller receives a message sent from a remote device at a first data rate. Second, the message is used to select a fuel pump from among the plurality of fuel pumps by mapping a first value in the message to the first fuel pump. Third, the message is used to select a dedicated channel from among the plurality of dedicated channels by mapping a second value in the message to the first dedicated channel. Fourth, the message is translated into a command for the fuel pump by changing the first data rate to a second data rate that is compatible with the fuel pump. Fifth, the command is communicated from the controller to the fuel pump over the first dedicated channel.

Another embodiment of the present invention provides an apparatus comprising a processor programmed to perform a method for using a controller to control a plurality of fuel pump devices that are connected to the controller over a plurality of dedicated channels. First, the controller receives a message sent from a remote device at a first data rate. Second, the message is used to select a fuel pump from among the plurality of fuel pumps by mapping a first value in the message to the first fuel pump. Third, the message is used to select a dedicated channel from among the plurality of dedicated channels by mapping a second value in the message to the first dedicated channel. Fourth, the message is translated into a command for the fuel pump by changing the first data rate to a second data rate that is compatible with the fuel pump. Fifth, the command is communicated from the controller to the fuel pump over the first dedicated channel.

A further embodiment of the present invention provides a computer program product encoded in a computer readable medium, the program product comprising instructions for using a controller to control a plurality of fuel pump devices that are connected to the controller over a plurality of dedicated channels. First, the controller receives a message sent from a remote device at a first data rate. Second, the message is used to select a fuel pump from among the plurality of fuel pumps by mapping a first value in the message to the first fuel pump. Third, the message is used to select a dedicated channel from among the plurality of dedicated channels by mapping a second value in the message to the first dedicated channel. Fourth, the message is translated into a command for the fuel pump by changing the first data rate to a second data rate that is compatible with the fuel pump. Fifth, the command is communicated from the controller to the fuel pump over the first dedicated channel.

It will be apparent to those skilled in the art that various devices may be used to carry out the systems, methods, apparatuses, or computer program products of the present invention, including personal computers and dedicated hardware devices designed specifically to carry out aspects of the present invention. While aspects of the present invention may be described and claimed in a particular statutory class, such as the method statutory class, this is for convenience only and one of skill in the art will understand that each aspect of the present invention can be described and claimed in any statutory class, including systems, apparatuses, methods, and computer program products.

Unless otherwise expressly stated, it is in no way intended that any method or aspect set forth herein be construed as requiring that its steps be performed in a specific order. Accordingly, where a method, system, or computer program product claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The foregoing and other advantages and features of the invention will become more apparent from the detailed description of embodiments of the invention given below with reference to the accompanying drawings.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DESCRIPTION OF THE INVENTION

The present invention provides methods, systems, apparatuses, and computer program products for a multi-channel fuel pump device controller. Before the present methods, systems, apparatuses, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Figure 1:
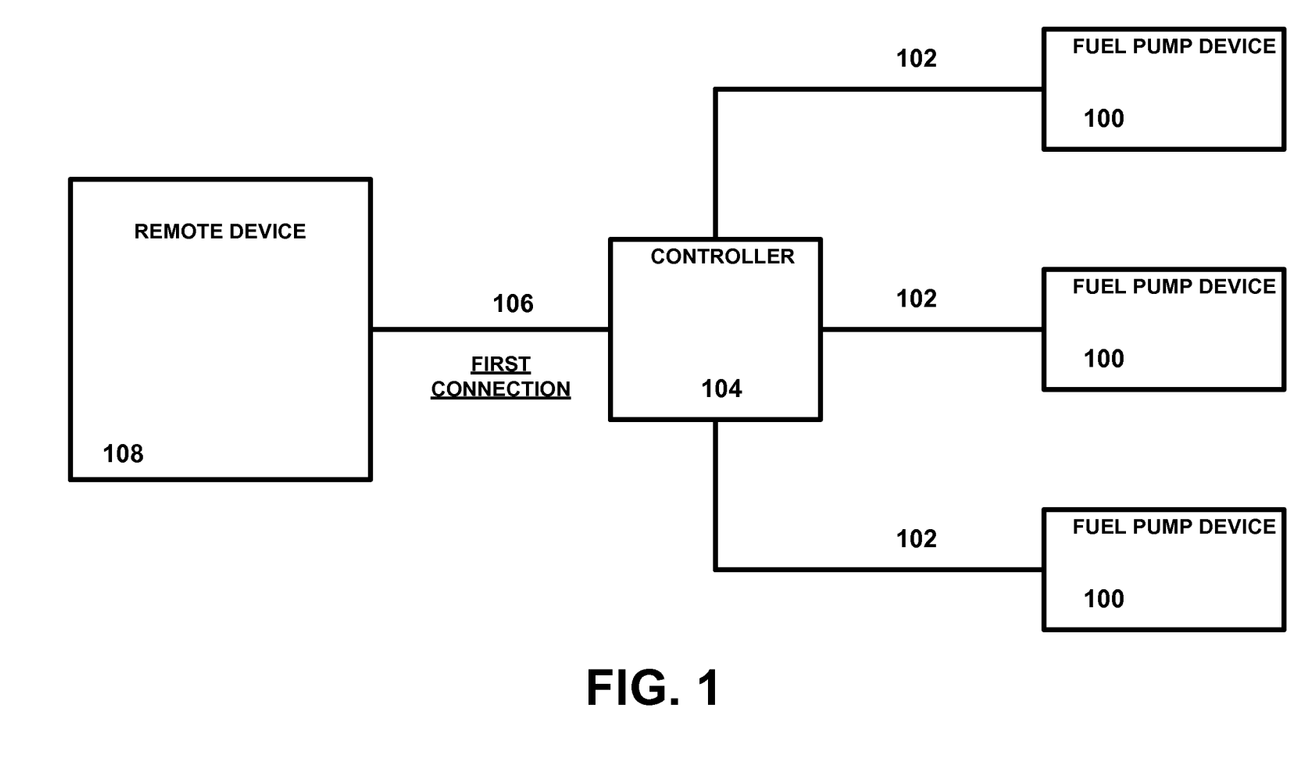
FIG. 1 illustrates a multi-channel controller system of one embodiment of the present invention.

A first embodiment of the present invention as shown in FIG. 1 provides a multi-channel controller 104 for controlling a plurality of fuel pump devices 100. The controller 104 can drive multiple channels or links 102 at their highest designed data thru put, and can comprise interrupt-driven I/O including hardware-based FIFO UART chips with hardware transmission and receive buffers capable of holding packets substantially sized to match a given communications protocol. The controller 104 provides for robust configuration options that allows linking any device type to whichever channel 102 is best for a specific fuel dispensing installation, mapped to the most adequate pump number on a point-of-sale terminal (POS), and linked to the most ideal pay-at-pump (PAP) address.

The controller 104 can support any appropriate communications protocol, such as Current Loop, RS485, RS422, RS232, LON, Ethernet, SSLAN, a TOKHEIM-compatible protocol, or any form of serial data communication used by fuel dispensers as understood by a person of skill in the art. The physical communication protocols are configurable per channel 102 to provide for maximum flexibility. The logical communication protocols are also configurable per channel 102. For example, in one embodiment of the present invention, the controller 104 can be connected to several Current Loop devices 100, with each using a different logical communications protocol. The controller 104 can also comprise software and hardware diagnostics to help solve problems. For example, the controller 104 can comprise a hardware debug port in various embodiments of the present invention. Further, fuel pump devices 100 can be distributed over the plurality of channels 102 to optimize performance and fault tolerance.

In any embodiment of the present invention, a multi-threaded application can work with all of the channels 102 to simplify programming, debugging, future enhancements, and evolution. A multi-processing operating system can be used to work with all threads, providing debug and maintenance capabilities. The application programs that deal with the fuel pump devices 100 can be programmed to work asynchronously with the of fuel pump devices 100.

A further embodiment of the present invention provides a controller 104 that is equipped with individual RS485 and/or Current Loop circuits that are capable of driving individual fuel pump devices 100. Dedicated communication channels 102 for fuel pump devices 100 are implemented by connecting the controller 104 to each channel 102, and then by connecting the controller 104 over a first connection 106 to a remote device 108 such as a site controller at a retail store. The controller 104 and the remote device 108 can communicate over the first connection 106 using any suitable method, such as Current Loop, RS485, RS422, RS232, LON, Ethernet, SSLAN, a TOKHEIM-compatible protocol, or any form of serial data communication used by fuel dispensers as understood by a person of skill in the art.

The controller 104 of embodiments of the present invention thus allows wiring and fuel pump devices 100 at the dispenser to be preserved while turning an existing installation into a network of many point-to-point networks rather than a single multi-drop network. By providing a plurality of dedicated Current Loop or RS485 channels 102 in embodiments of the present invention, the controller 104 can interact directly with individual fuel pump devices 100, providing several advantages over conventional fuel dispensing networks. For example, the controller 104 can discover the address of a fuel pump device 100 without the need for manual configuration. Diagnosis of problems with a fuel pump device 100 or its associated wiring 102 becomes simplified. Since the controller 104 is connected to each fuel pump device 100 by a dedicated link 102, errors created by a fuel pump device 100 do not impact other devices connected to the controller 104 or the larger network, rendering the whole network more reliable, both resilient to faults and more responsive in performance of its duty cycle. Because fuel pump devices 100 each have their own dedicated channel 102, full communication bandwidth is available to each fuel pump device 100. Fuel pump devices 100 can fail individually without the need for timeout impacts on other devices 100. Fuel pump device 100 addresses, types, brands, and physical and logical communication protocols can thus be easily detected.

Similarly, use of the controller 104 in embodiments of the present invention simplifies programming models because any fuel pump device 100 responding on a dedicated channel 102 can be assumed to be a known device, and diagnostics can proceed without concern for confusing or inadvertently programming the wrong fuel pump device 100. All of these advantages lower maintenance in the form of the ability to ignore factory settings for addressing values. In a failure mode when it may become necessary to overload one link 102 with two devices because no other connections are available, the flexibility of embodiments of the present invention to operate in this mode during exception conditions provides an additional advantage.

The controller 104 can include lighting to indicate when a dedicated channel 102 has failed. In various embodiments of the present invention, the wiring for each channel 102 can comprise isolated wiring (optical or inductive isolation) so that channels 102 do not interfere with each other even under lightning strike conditions.

In another embodiment of the present invention, the controller 104 can sense open loop voltages of one or more of the plurality of dedicated channels 102, and adjust a voltage applied to one or more of the plurality of dedicated channels 102 to lower power consumption based on the sensed open loop voltage. Similarly, the controller 104 can adjust a voltage applied to one or more of the plurality of dedicated channels 102 to lower electromagnetic radiation based on the open loop voltage, or it can determine if tampering has occurred using the sensed open loop voltage. Sensing open loop voltages can also eliminate spark scenarios across the open-loop gap, providing a safety improvement for the controller 104 and its connected fuel pump devices 100, and can also reduces ringing on bit transitions, providing more robust communications. Adapting power consumption dynamically also increases the energy efficiency of the controller 104 and generates less heat output, which extends the life of the controller's 104 component parts.

The active or driver side of a Current Loop channel 102 can include the use of one "hot" and one ground wire for communications in various embodiments of the present invention. Rather than a strict loop, this embodiment provides the fuel pump device 100 with the perception of a loop but provides better communication and lower susceptibility to external interference.

In yet another embodiment of the present invention, the controller 104 provides processing and state storage such that other devices, such as remote device 108, can relate more abstractly to the fuel pump devices 100, relying on the channel management hardware and software for real-time operation of the communication protocols.

In another embodiment of the present invention, the controller 104 provides multiple dedicated channels 102 and can also provide fuel pump devices 100 with address translation, protocol slotting, and baud rate multiplication pass-thru using a mapping of addresses such that the specific channel 102 and address for each fuel pump device 100 is resolved to a value, such as a unique value. The controller 104 thus makes a network of fuel pump devices 100 communicating over dedicated channels 102 appear to other systems as a smaller number of channels operating at higher bandwidths. In this way, legacy control systems can be adapted simply, such as by a baud rate change, to a higher rate of communication useful with other fuel pump devices 100. Thus, the controller 104 of the present embodiment can extend the address space and/or perform protocol translation where needed. All of these functionalities can be integrated with third party control solutions via USB, Ethernet, or other communication standards.

In a further embodiment of the present invention, the controller 104 comprises a power supply that includes redundant circuitry. In case of failure of a main power supply, the secondary power supply would transition smoothly to ensure continuity of supply to the fuel pump device infrastructure hardware and software. In another embodiment of the present invention, a second controller is placed on the fuel pump network. For Current Loop devices, the second controller is placed in serial across the connection to the primary controller and remains passive until instructed to become active by a command.

In embodiments of the present invention involving a fuel pump dispenser with two physical networks linking one physical enclosure, the wiring from two devices 100 can be combined to create a dedicated channel for Current Loop or RS485. In this case, the latency of turn-around events can be removed, thus improving effective line speed throughput. Furthermore, by eliminating protocol synchronization, packet sizes can be increased, again improving the bandwidth perceived from the application level.

As understood by one of skill in the art, an interface device wiring hub refers to the associated circuits, connections, and power supplies that communicate with a network of fuel pump devices 100. Such a wiring hub may be connected to controlling POS systems through a number of different interfaces, such as through two serial connections, one of them master unless over-ridden by a control signal from another, or by using one serial connection internal to the device and by providing Ethernet connectivity outbound to the rest of the network.

The wiring hub can further comprise a dedicated forecourt Ethernet hub when it is connecting devices or adapters to devices that are Ethernet based. Use of a forecourt Ethernet hub has advantages, such as providing more ports than are available on the store hub as well as little network latency penalty. Further, ports fail individually in an isolated manner even when lightning hits. The wiring hub can further comprise a redundant power supply to improve reliability (two independent devices taking AC to DC) with a smooth switchover that does not reboot the hardware as well as a firewall. The wiring hub may include hardware security with SAM (secure access module) slots in various embodiments of the present invention.

Figure 2:
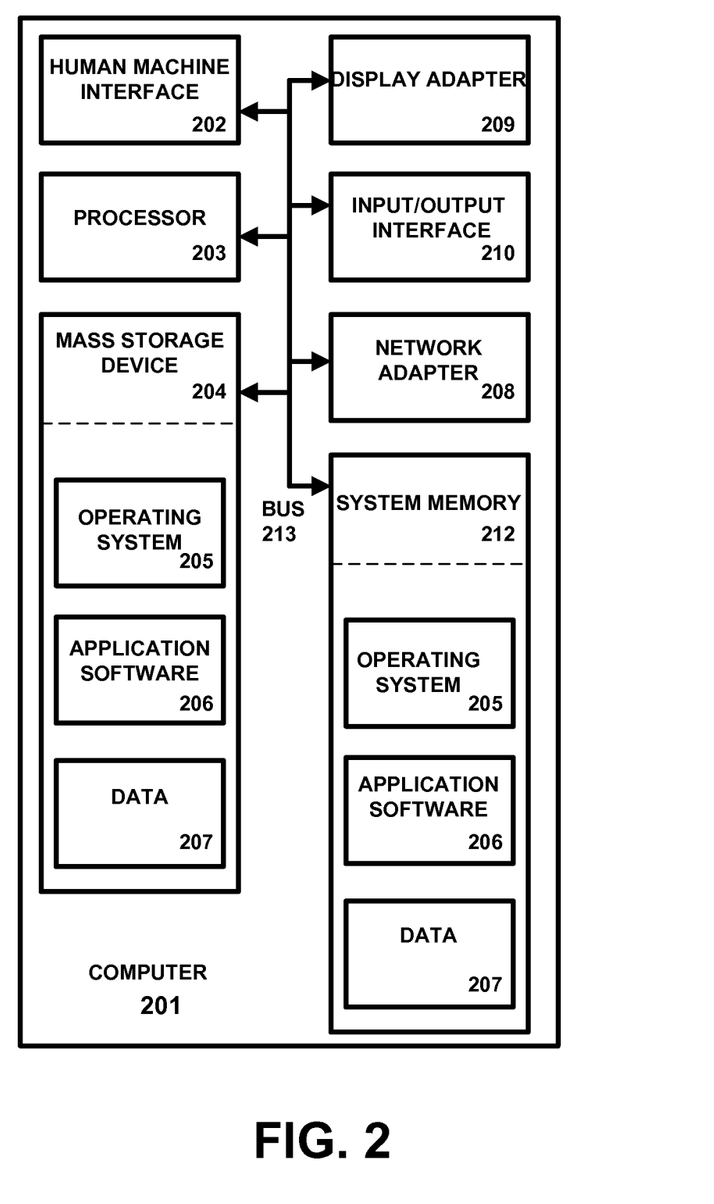
FIG. 2 shows a logical overview of a computer system which may be used with various embodiments of the present invention.

A remote device 108 such as a point-of-sale terminal or site controller, as well as the controller 104, can comprise a general purpose computer 201 as illustrated in FIG. 2 in various embodiments of the present invention. The components of the computer 201 can include, but are not limited to, one or more processors or processing units 203, a system memory 212, and a system bus 213 that couples various system components including the processor 203 to the system memory 212.

The processor 203 in FIG. 2 can be an x-86 compatible processor, including an INTEL CORE DUO or an INTEL ATOM, manufactured by Intel Corporation, or an ATHLON X2 processor, manufactured by Advanced Micro Devices Corporation. Processors utilizing other instruction sets may also be used, including those manufactured by Apple, IBM, or NEC. For example, the processor 203 can be an XSCALE processor.

The system bus 213 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 213, and all buses specified in this description can also be implemented over a wired or wireless network connection and each of the subsystems, including the processor 203, a mass storage device 204, an operating system 205, application software 206, data 207, a network adapter 208, system memory 212, an Input/Output Interface 210, a display adapter 209, a display device, and a human machine interface 202, can be contained within one or more remote computing devices at physically separate locations, connected through buses of this form, in effect implementing a fully distributed system.

The operating system 205 in FIG. 2 includes operating systems such as MICROSOFT WINDOWS XP, WINDOWS CE, WINDOWS VISTA, and REDHAT LINUX, FREE BSD, or SUN MICROSYSTEMS SOLARIS. Additionally, the application software 206 may include web browsing software, such as MICROSOFT INTERNET EXPLORER or MOZILLA FIREFOX, enabling a user to view HTML, SGML, XML, or any other suitably constructed document language on the display device.

The computer 201 typically includes a variety of computer readable media. Computer readable media or medium includes any tangible media that can be accessed by a computer, such as computer 201. By way of example, computer readable mediums include CD-ROM, digital versatile disks (DVD) or other optical storage, magnetic cassettes, magnetic tape, magnetic disk storage or other magnetic storage devices, or any other such tangible media.

The system memory 212 typically contains data such as data 207 and/or program modules such as operating system 205 and application software 206 that are immediately accessible to and/or are presently operated on by the processing unit 203.

The computer 201 may also include other storage media. By way of example, FIG. 2 illustrates a mass storage device 204 which can provide non-volatile storage of computer code, computer readable instructions, data structures, program modules, and other data for the computer 201. For example, a mass storage device 204 can be a hard disk, a removable magnetic disk, a removable optical disk, magnetic cassette, magnetic storage device, flash memory device, CD-ROM, digital versatile disk (DVD) or other optical storage, random access memories (RAM), read only memories (ROM), solid state storage units, electrically erasable programmable read-only memory (EEPROM), and the like.

Any number of program modules can be stored on the mass storage device 204, including by way of example, an operating system 205 and application software 206. Each of the operating system 205 and application software 206 (or some combination thereof) may include elements of the programming and the application software 206. Data 207 can also be stored on the mass storage device 204. Data 204 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 201 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 203 via a human machine interface 202 that is coupled to the system bus 213, but may be connected by other interface and bus structures, such as a parallel port, serial port, game port, or a universal serial bus (USB).

A display device can also be connected to the system bus 213 via an interface, such as a display adapter 209. For example, a display device can be a cathode ray tube (CRT) monitor, a Liquid Crystal Display (LCD), or a television. In addition to the display device, other output peripheral devices can include components such as speakers (not shown) and a printer (not shown) which can be connected to the computer 201 via Input/Output Interface 210. The Input/Output Interface 210 can include an interface for connecting to devices which communication over serial, parallel, or legacy connections such as Current Loop, RS485, RS422, RS232, LON, Ethernet, SSLAN, a TOKHEIM-compatible protocol, or any form of serial data communication used by fuel dispensers as understood by a person of skill in the art.

The computer 201 can operate in a networked environment using logical connections to one or more remote computing devices. By way of example, a remote computing device can be a personal computer, portable computer, a server, a router, a set top box, a network computer, a peer device or other common network node, and so on. Logical connections between the computer 201 and a remote computing device can be made via a local area network (LAN) and a general wide area network (WAN). Such network connections can be through a network adapter 208. A network adapter 208 can be implemented in both wired and wireless environments. Such networking environments are commonplace in offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of application software 206 may be stored on or transmitted across some form of computer readable media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state devices, or any other medium which can be used to store the desired information and which can be accessed by a computer.

In various embodiments of the present invention, the controller 104 can comprise an apparatus using the WINDOWS CE 5.0 operating system, an INTEL CELERON M 900 MHz processor, an INTEL 852GM chipset, 256 megabytes of SDRAM, and 64 megabytes of flash memory for mass storage. The controller 104 may provide 16 RS485 ports and 16 Current Loop ports for connecting to fuel pump devices. The Current Loop ports can have selectable current levels, such as 20 mA, 30 mA, and 45 mA.

Figure 3:
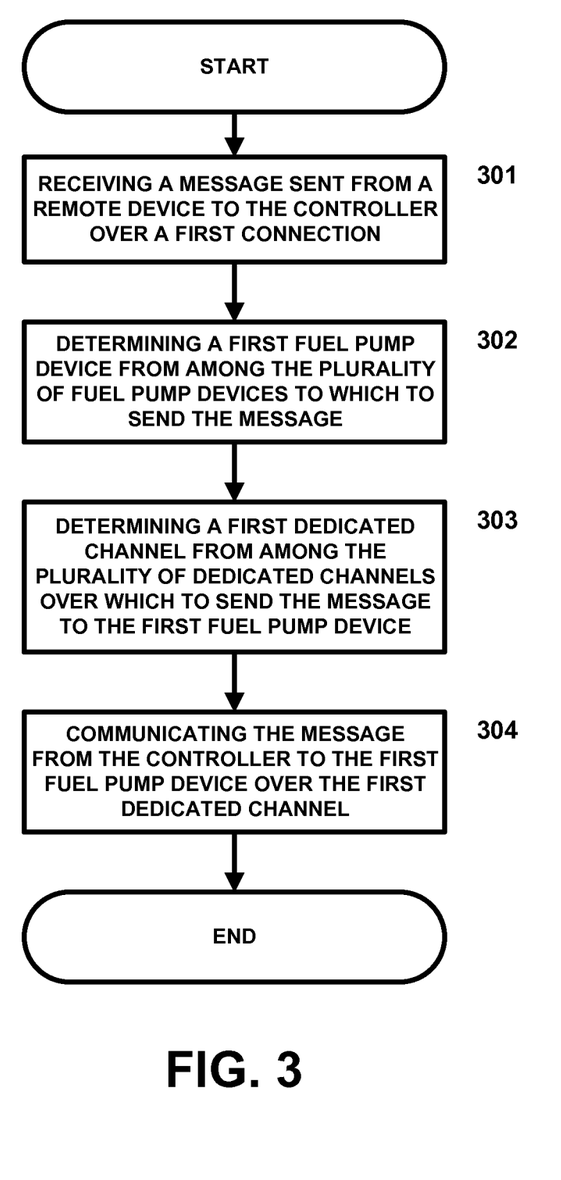
FIG. 3 illustrates one embodiment of the present invention for using a controller to control a plurality of fuel pump devices that are connected to the controller over a plurality of dedicated channels.

A method for using a controller, such as the controller 104 of FIG. 1, to control a plurality of fuel pump devices that are connected to the controller over a plurality of dedicated channels is illustrated in FIG. 3. First, a message is received 301 from a remote device by the controller over a first connection. Next, a first fuel pump device is determined 302 from among the plurality of fuel pump devices to which to send the message, and then a first dedicated channel is determined 304 from among the plurality of dedicated channels over which to send the message to the first fuel pump device. Finally, the message is communicated 304 from the controller to the first fuel pump device over the first dedicated channel.

In any embodiment of the present invention, a remote device can comprise at least one of a controller, a point-of-sale terminal, a fuel pump device, or a site controller. Similarly, a fuel pump device in any embodiment of the present invention can be at least one of a fuel dispenser, pay-at-pump terminal, fuel controller, electronic payment controller, magnetic card reader, bar code reader, biometric reader, radio frequency reader, or smartcard reader.

A system or apparatus comprising a processor can be used to perform embodiments of the present invention. For example, one embodiment of the present invention provides an apparatus comprising a processor programmed to perform the method described in FIG. 3. First, a message is received from a remote device by the controller over a first connection. Next, a first fuel pump device is determined from among the plurality of fuel pump devices to which to send the message, and then a first dedicated channel is determined from among the plurality of dedicated channels over which to send the message to the first fuel pump device. Finally, the message is communicated from the controller to the first fuel pump device over the first dedicated channel.

Similarly, embodiments of the present invention can comprise a computer program product encoded in a computer readable medium including instructions for performing aspects or embodiments of the present invention. For example, another embodiment of the present invention provides a computer program product encoded in a computer readable medium, the program product comprising instructions for performing the method described in FIG. 3. First, a message is received from a remote device by the controller over a first connection. Next, a first fuel pump device is determined from among the plurality of fuel pump devices to which to send the message, and then a first dedicated channel is determined from among the plurality of dedicated channels over which to send the message to the first fuel pump device. Finally, the message is communicated from the controller to the first fuel pump device over the first dedicated channel.

The controller of any embodiment of the present invention, such as the controller 104 of FIG. 1, can be installed in or on a fuel pump housing, and/or it can be integrated into a fuel pump controller.

Figure 4:
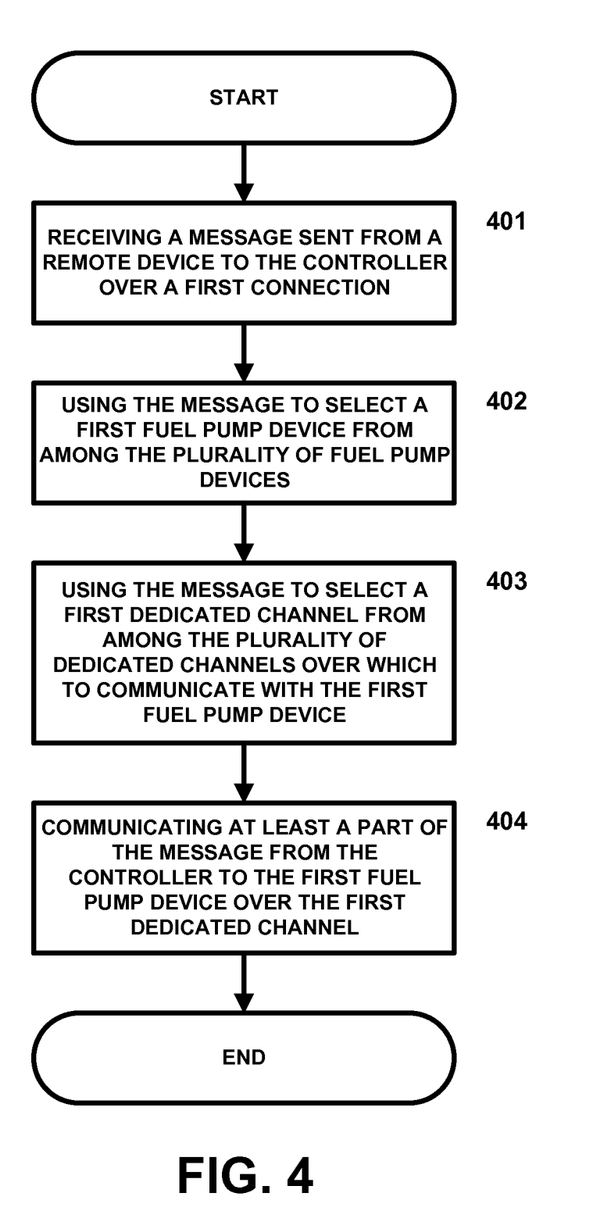
FIG. 4 illustrates another embodiment of the present invention for using a controller to control a plurality of fuel pump devices that are connected to the controller over a plurality of dedicated channels.

FIG. 4 shows the method of one embodiment of the present invention for using a controller to control a plurality of fuel pump devices that are connected to the controller over a plurality of dedicated channels. First in the embodiment of FIG. 4, a message sent 401 from a remote device to the controller over a first connection is received, and then the message is used 402 to select a first fuel pump device from among the plurality of fuel pump devices. The message is then used 403 to select a first dedicated channel from among the plurality of dedicated channels over which to communicate the message to the first fuel pump device. Finally, at least a part of the message is communicated 404 from the controller to the first fuel pump device over the first dedicated channel.

In any embodiment of the present invention, such as in the embodiment of FIG. 4, using the message to select a first fuel pump device can comprise using the message to select a first fuel pump device from among the plurality of fuel pump devices by mapping the message to the first fuel pump device. In various embodiments, the message can comprise a value, for example a unique value, that maps to the first fuel pump device from among the plurality of fuel pump devices.

Similarly, in any embodiment of the present invention, such as in the embodiment of FIG. 4, using the message to select a first dedicated channel can comprise using the message to select a first dedicated channel from among the plurality of dedicated channels over which to communicate the message to the first fuel pump device by mapping the message to the first dedicated channel. The message can comprise a value, such as a unique value, that maps to the first dedicated channel from among the plurality of dedicated channels. In further embodiments, the message can comprise a value, such as a unique value, that maps to a fuel pump device and to a dedicated channel.

A further embodiment of the present invention provides an apparatus comprising a processor programmed to perform the method described in FIG. 4 and its related embodiments. First in the present embodiment a message sent from a remote device to the controller over a first connection is received, and then the message is used to select a first fuel pump device from among the plurality of fuel pump devices. The message is then used to select a first dedicated channel from among the plurality of dedicated channels over which to communicate the message to the first fuel pump device. Finally, at least a part of the message is communicated from the controller to the first fuel pump device over the first dedicated channel.

The present invention also provides embodiments for a computer program product encoded in a computer readable medium, the program product comprising instructions for performing the method described in FIG. 4 and its related embodiments. First in the current embodiment a message sent from a remote device to the controller over a first connection is received, and then the message is used to select a first fuel pump device from among the plurality of fuel pump devices. The message is then used to select a first dedicated channel from among the plurality of dedicated channels over which to communicate the message to the first fuel pump device. Finally, at least a part of the message is communicated from the controller to the first fuel pump device over the first dedicated channel.

Figure 5:
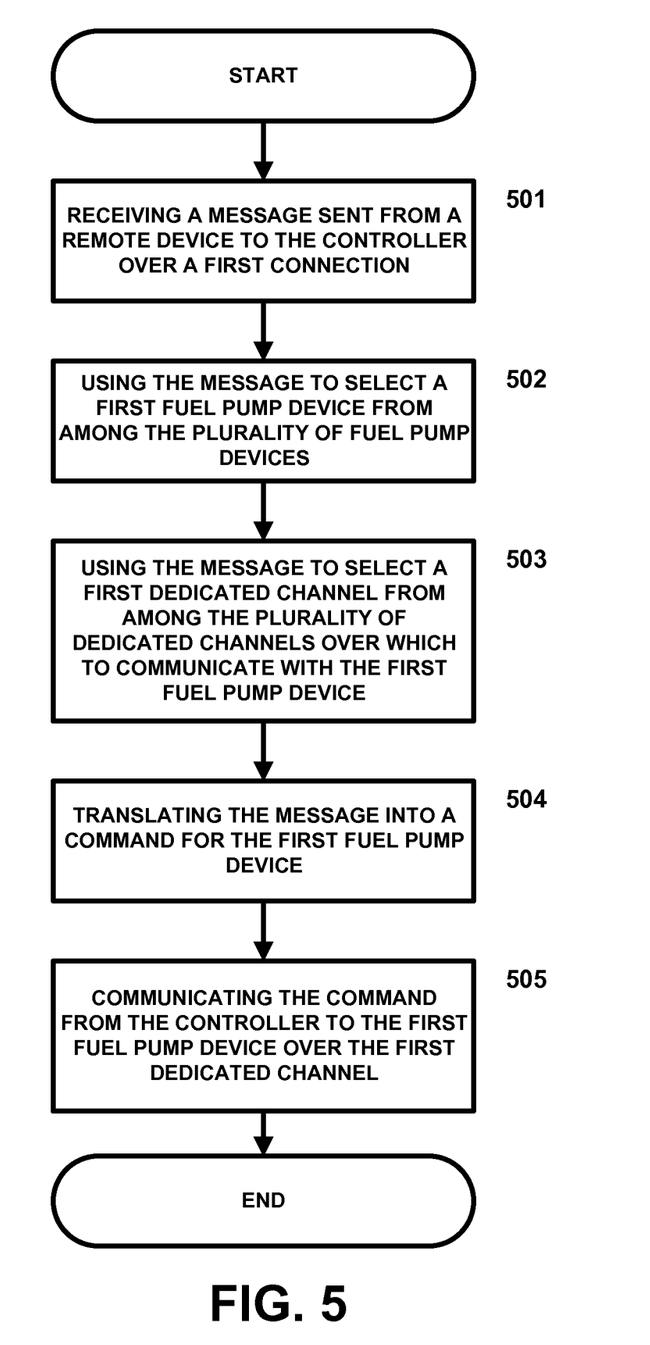
FIG. 5 illustrates a further embodiment of the present invention for using a controller to control a plurality of fuel pump devices that are connected to the controller over a plurality of dedicated channels.

Another embodiment of the present invention for using a controller to control a plurality of fuel pump devices that are connected to the controller over a plurality of dedicated channels is shown in FIG. 5. First, a message sent 501 from a remote device to the controller over a first connection is received. Second, the message is used 502 to select a first fuel pump device from among the plurality of fuel pump devices. Third, the message is used 503 to select a first dedicated channel from among the plurality of dedicated channels over which to communicate with the first fuel pump device, and then the message is translated 504 into a command for the first fuel pump device. Fifth, the command is communicated 505 from the controller to the first fuel pump device over the first dedicated channel.

In various embodiments of the present invention, such as the in the embodiment of FIG. 5, translating can comprise translating the message into a command for the first fuel pump device by changing a communications rate of the message to a first communication rate that is compatible with the first fuel pump device and the first dedicated channel. Translating can also comprise translating the message into a command for the first fuel pump device by changing a physical communications protocol of the message to a first physical communications protocol compatible with the first fuel pump device and the first dedicated channel. A physical communications protocol can comprise at least one of a voltage or a current in embodiments of the present invention. For example, the Current Loop current can be changed to one of 20 mA, 30 mA, or 45 mA depending on the particular fuel pump device and/or its corresponding dedicated channel.

Similarly, translating can comprise translating the message into a command for the first fuel pump device by changing the logical communications protocol of the message to a first logical communications protocol compatible with the first fuel pump device and the first dedicated channel. For example, a message received by the controller over an Ethernet connection can be translated into a command compatible with any suitable protocol such as Current Loop, RS485, RS422, RS232, LON, Ethernet, SSLAN, a TOKHEIM-compatible protocol, or any form of serial data communication used by fuel dispensers as understood by a person of skill in the art.

In further embodiments, translating can comprise translating the message into a command for the first fuel pump device by changing the device address of the message to a first device address compatible the first fuel pump device. A device address can comprise a fuel pump number in embodiments of the present invention. Translating a fuel pump number can be useful in several circumstances, such as when there are too many fuel pumps for the available fuel pump address space, or when there is more than one fuel pump with the same number.

A further embodiment of the present invention provides an apparatus comprising a processor programmed to perform the method described in FIG. 5 and its related embodiments. First in the current embodiment, a message sent from a remote device to the controller over a first connection is received. Second, the message is used to select a first fuel pump device from among the plurality of fuel pump devices. Third, the message is used to select a first dedicated channel from among the plurality of dedicated channels over which to communicate with the first fuel pump device, and then the message is translated into a command for the first fuel pump device. Fifth, the command is communicated from the controller to the first fuel pump device over the first dedicated channel.

The present invention also provides embodiments for a computer program product encoded in a computer readable medium, the program product comprising instructions for performing the method described in FIG. 5 and its related embodiments. First in the current embodiment, a message sent from a remote device to the controller over a first connection is received. Second, the message is used to select a first fuel pump device from among the plurality of fuel pump devices. Third, the message is used to select a first dedicated channel from among the plurality of dedicated channels over which to communicate with the first fuel pump device, and then the message is translated into a command for the first fuel pump device. Fifth, the command is communicated from the controller to the first fuel pump device over the first dedicated channel.

In further embodiments of the present invention, the controller can sense an open loop voltage of one or more of the plurality of dedicated channels and take various steps based on the sensed voltage. For example, in one embodiment, a voltage applied to one or more of the plurality of dedicated channels can be adjusted to lower power consumption based on the sensed open loop voltage. In another embodiment, a voltage applied to one or more of the plurality of dedicated channels can be adjusted to lower electromagnetic radiation based on the open loop voltage. The sensed voltage can also be used to determine if tampering has occurred.

Figure 6:
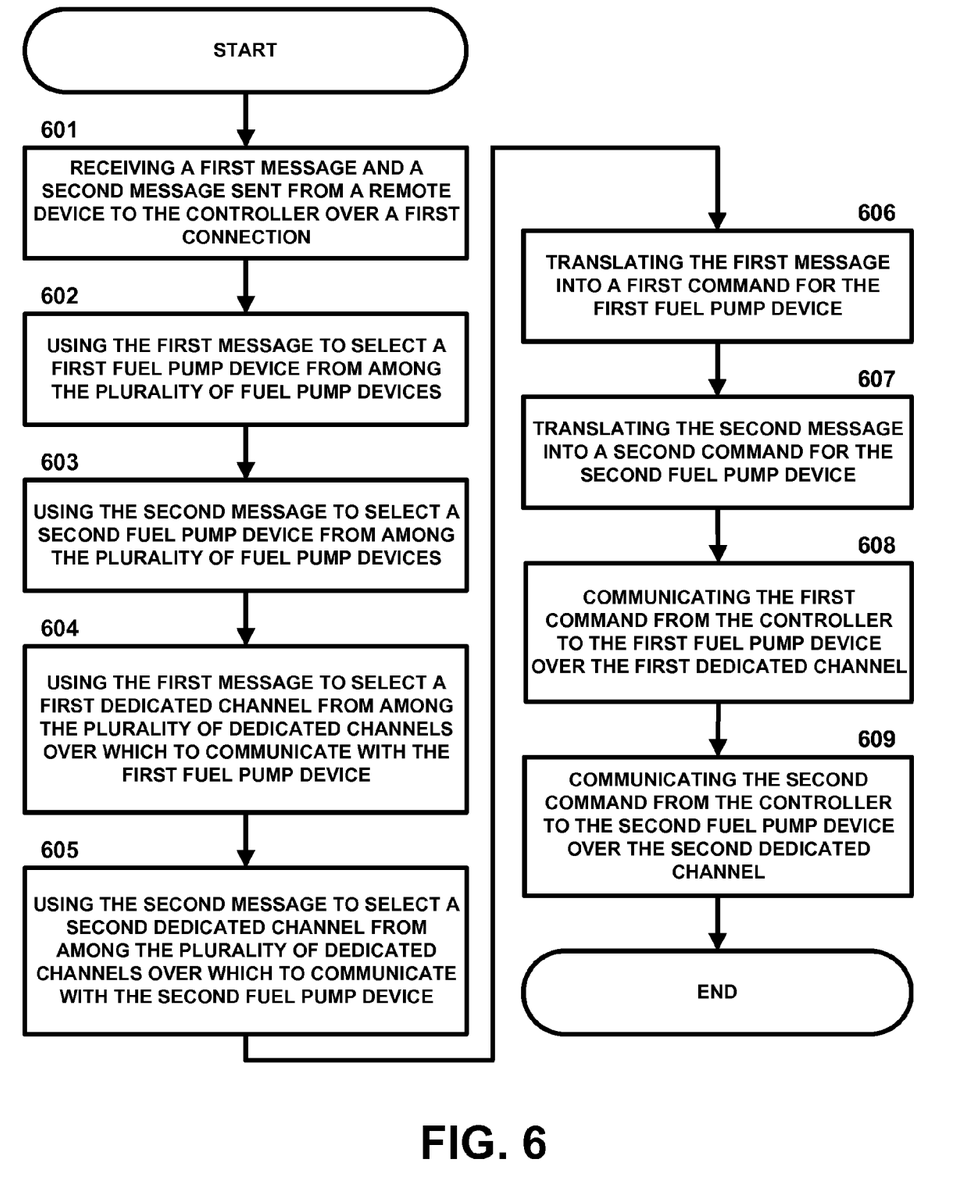
FIG. 6 illustrates yet another embodiment of the present invention for using a controller to control a plurality of fuel pump devices that are connected to the controller over a plurality of dedicated channels.

FIG. 6 shows a further embodiment of the present invention for using a controller to control a plurality of fuel pump devices that are connected to the controller over a plurality of dedicated channels. First, a first message and a second message sent 601 from a remote device to the controller over a first connection are received, and then the first message is used 602 to select a first fuel pump device from among the plurality of fuel pump devices and the second message is used 603 to select a second fuel pump device from among the plurality of fuel pump devices. Fourth, the first message is used 604 to select a first dedicated channel from among the plurality of dedicated channels over which to communicate with the first fuel pump device.

Next in the embodiment of FIG. 6, the second message is used 605 to select a second dedicated channel from among the plurality of dedicated channels over which to communicate with the second fuel pump device. Then, the first message is translated 606 into a first command for the first fuel pump device, and the second message is translated 607 into a second command for the second fuel pump device. Finally, the first command is communicated 608 from the controller to the first fuel pump device over the first dedicated channel and the second command is communicated 609 from the controller to the second fuel pump device over the second dedicated channel.

A further embodiment of the present invention provides an apparatus comprising a processor programmed to perform the method described in FIG. 6 and its related embodiments. First in the present embodiment a first message and a second message sent from a remote device to the controller over a first connection are received, and then the first message is used to select a first fuel pump device from among the plurality of fuel pump devices and the second message is used to select a second fuel pump device from among the plurality of fuel pump devices. Fourth, the first message is used to select a first dedicated channel from among the plurality of dedicated channels over which to communicate with the first fuel pump device. Next the second message is used to select a second dedicated channel from among the plurality of dedicated channels over which to communicate with the second fuel pump device. Then, the first message is translated into a first command for the first fuel pump device, and the second message is translated into a second command for the second fuel pump device. Finally, the first command is communicated from the controller to the first fuel pump device over the first dedicated channel and the second command is communicated from the controller to the second fuel pump device over the second dedicated channel.

The present invention also provides embodiments for a computer program product encoded in a computer readable medium, the program product comprising instructions for performing the method described in FIG. 6 and its related embodiments. First in the current embodiment a first message and a second message sent from a remote device to the controller over a first connection are received, and then the first message is used to select a first fuel pump device from among the plurality of fuel pump devices and the second message is used to select a second fuel pump device from among the plurality of fuel pump devices. Fourth, the first message is used to select a first dedicated channel from among the plurality of dedicated channels over which to communicate with the first fuel pump device. Next the second message is used to select a second dedicated channel from among the plurality of dedicated channels over which to communicate with the second fuel pump device. Then, the first message is translated into a first command for the first fuel pump device, and the second message is translated into a second command for the second fuel pump device. Finally, the first command is communicated from the controller to the first fuel pump device over the first dedicated channel and the second command is communicated from the controller to the second fuel pump device over the second dedicated channel.

In the embodiment of FIG. 6, the first connection can comprise an Ethernet connection, and the first dedicated channel and the second dedicated channel can each be one of a Current Loop or RS485 channel. For example, in one embodiment of the present invention, the first connection comprises an Ethernet connection, the first dedicated channel comprises a closed loop connection, and the second dedicated channel comprises a RS485 connection. Translating can then be performed to translate the communications rate, physical communications protocol, logical communications protocol, or address to be compatible with the first and second fuel pump devices.

While the present invention has been described in detail in connection with various embodiments, it should be understood that the present invention is not limited to the above-disclosed embodiments. Rather, the invention can be modified to incorporate any number of variations, alternations, substitutions, or equivalent arrangements not heretofore described, but which are commensurate with the spirit and scope of the invention.

We claim:

1. A method for using a controller to control a plurality of fuel pump devices that are connected to the controller over a plurality of dedicated channels, the method comprising:
   a. receiving a message sent from a remote device to the controller over a first connection;
   b. using the message to select a first fuel pump device from among the plurality of fuel pump devices;
   c. using the message to select a first dedicated channel from among the plurality of dedicated channels over which to communicate the message to the first fuel pump device;
   d. translating the message into a command for the first fuel pump device;
   e. communicating the command from the controller to the first fuel pump device over the first dedicated channel;
   f. sensing an open loop voltage of one or more of the plurality of dedicated channels; and
   g. adjusting a voltage applied to one or more of the plurality of dedicated channels to lower power consumption based on the sensed open loop voltage.

2. The method of claim 1, wherein using the message to select a first fuel pump device comprises using the message to select a first fuel pump device from among the plurality of fuel pump devices by mapping the message to the first fuel pump device.

3. The method of claim 2, wherein the message comprises a value that is mapped to the first fuel pump device from among the plurality of fuel pump devices.

4. The method of claim 1, wherein using the message to select a first dedicated channel comprises using the message to select a first dedicated channel from among the plurality of dedicated channels over which to communicate the message to the first fuel pump device by mapping the message to the first dedicated channel.

5. The method of claim 4, wherein the message comprises a value that is mapped to the first dedicated channel from among the plurality of dedicated channels.

6. The method of claim 1, wherein translating comprises translating the message into a command for the first fuel pump device by changing a communication rate of the message to a first communication rate that is compatible with the first fuel pump device and the first dedicated channel.

7. The method of claim 6, wherein the communication rate comprises a baud rate.

8. The method of claim 1, wherein translating comprises translating the message into a command for the first fuel pump device by changing a physical communications protocol of the message to a first physical communications protocol compatible with the first fuel pump device and the first dedicated channel.

9. The method of claim 8, wherein the first physical communications protocol comprises at least one of a voltage or a current.

10. The method of claim 1, wherein translating comprises translating the message into a command for the first fuel pump device by changing the logical communications protocol of the message to a first logical communications protocol compatible with the first fuel pump device and the first dedicated channel.

11. The method of claim 1, wherein the first logical communications protocol comprises at least one of an RS485, RS232, Current Loop, or TOKHEIM-compatible communications protocol.

12. The method of claim 1, wherein translating comprises translating the message into a command for the first fuel pump device by changing a device address of the message to a first device address compatible with the first fuel pump device and the first dedicated channel.

13. The method of claim 1, wherein the device address comprises a fuel pump number.

14. The method of claim 1, further comprising:
   h. determining if tampering has occurred using the sensed open loop voltage.

15. The method of claim 1, wherein each dedicated channel comprises at least one of an RS485, RS232, Current Loop, or TOKHEIM-compatible connection.

16. The method of claim 1, wherein the controller is installed in a fuel pump housing.

17. A method of operating a controller which is connected between a plurality of fuel pump devices and a remote point-of-sale (POS) terminal located in a retail store to enable the POS terminal to communicate with and control the plurality of fuel pump devices that are connected to the controller over a plurality of dedicated channels extending from the pay-at-pump fuel terminals to the controller, the method comprising:
   a. receiving a first message and a second message sent from the POS terminal to the controller over a first connection;
   b. using the first message to select a first fuel pump device from among the plurality of fuel pump devices by mapping the first message to the first fuel pump device;
   c. using the second message to select a second fuel pump device from among the plurality of fuel pump devices by mapping the second message to the second fuel pump device;
   d. using the first message to select a first dedicated channel from among the plurality of dedicated channels by mapping the first message to the first dedicated channel, wherein the first dedicated channel comprises a first individual circuit, and wherein the first dedicated channel is isolated from the remainder of the plurality of dedicated channels;
   e. using the second message to select a second dedicated channel from among the plurality of dedicated channels by mapping the second message to the second dedicated channel, wherein the second dedicated channel comprises a second individual circuit, and wherein the second dedicated channel is isolated from the remainder of the plurality of dedicated channels;
   f. translating the first message into a first command for the first fuel pump device;
   g. translating the second message into a second command for the second fuel pump device;
   h. communicating the first command from the controller to the first fuel pump device over the first dedicated channel and thereby to control the first fuel pump device in response to the first message received from the POS terminal; and
   i. communicating the second command from the controller to the second fuel pump device over the second dedicated channel and thereby to control the second fuel pump device in response to the second message received from the POS terminal.

18. The method of claim 17, wherein (i) translating the first message comprises translating the first message into the first command for the first fuel pump device by changing a device address of the first message to a first device address that is compatible with the first fuel pump device and the first dedicated channel, and (ii) translating the second message comprises translating the second message into the second command for the second fuel pump device by changing a device address of the second message to a second device address that is compatible with the second fuel pump device and the second dedicated channel.

19. The method of claim 18, wherein each device address comprises a fuel pump number.

20. The method of claim 17, wherein the first dedicated channel comprises a closed loop connection and the second dedicated channel comprises a RS485 connection.

21. The method of claim 17, wherein the controller is installed in a fuel pump housing.

22. A method of operating a controller which is connected between a plurality of pay-at-pump fuel terminals and a remote point-of-sale (POS) terminal located in a retail store to enable the POS terminal to communicate with and control the plurality of pay-at-pump fuel terminals that are connected to the controller over a plurality of dedicated channels extending from the pay-at-pump fuel terminals to the controller, the method comprising:
   a. receiving by the controller a message sent from the POS terminal at a first data rate;
   b. using the message to select a pay-at-pump fuel terminal from among the plurality of pay-at-pump fuel terminals by mapping a first value in the message to the pay-at-pump fuel terminal;
   c. using the message to select a dedicated channel from among the plurality of dedicated channels by mapping a second value in the message to the dedicated channel, wherein the dedicated channel comprises an individual circuit, and wherein the dedicated channel is isolated from the remainder of the plurality of dedicated channels;
   d. translating the message into a command for the pay-at-pump fuel terminal by changing the first data rate to a second data rate that is compatible with the pay-at-pump fuel terminal; and
   e. communicating the command from the controller to the pay-at-pump fuel terminal over the dedicated channel and thereby to control the pay-at-pump fuel terminal in response to the message received from the POS terminal.

23. The method of claim 22, further comprising:
   f. sensing an open loop voltage of one or more of the plurality of dedicated channels; and
   g. adjusting a voltage applied to one or more of the plurality of dedicated channels to lower power consumption based on the sensed open loop voltage.

24. The method of claim 22, further comprising:
   f. sensing an open loop voltage of one or more of the plurality of dedicated channels; and
   g. adjusting a voltage applied to one or more of the plurality of dedicated channels to lower electro-magnetic radiation based on the open loop voltage.

25. A method for using a controller to control a plurality of fuel pump devices that are connected to the controller over a plurality of dedicated channels, the method comprising:
   a. receiving a message sent from a remote device to the controller over a first connection;
   b. using the message to select a first fuel pump device from among the plurality of fuel pump devices;
   c. using the message to select a first dedicated channel from among the plurality of dedicated channels over which to communicate the message to the first fuel pump device;

d. translating the message into a command for the first fuel pump device; and e. communicating the command from the controller to the first fuel pump device over the first dedicated channel;

f. sensing an open loop voltage of one or more of the plurality of dedicated channels; and g. adjusting a voltage applied to one or more of the plurality of dedicated channels to lower electro-magnetic radiation based on the open loop voltage.

26. The method of claim 25, wherein using the message to select a first fuel pump device comprises using the message to select a first fuel pump device from among the plurality of fuel pump devices by mapping the message to the first fuel pump device.

27. The method of claim 26, wherein the message comprises a value that is mapped to the first fuel pump device from among the plurality of fuel pump devices.

28. The method of claim 25, wherein using the message to select a first dedicated channel comprises using the message to select a first dedicated channel from among the plurality of dedicated channels over which to communicate the message to the first fuel pump device by mapping the message to the first dedicated channel.

29. The method of claim 28, wherein the message comprises a value that is mapped to the first dedicated channel from among the plurality of dedicated channels.

30. The method of claim 25, wherein translating comprises translating the message into a command for the first fuel pump device by changing a communication rate of the message to a first communication rate that is compatible with the first fuel pump device and the first dedicated channel.

31. The method of claim 30, wherein the communication rate comprises a baud rate.

32. The method of claim 25, wherein translating comprises translating the message into a command for the first fuel pump device by changing a physical communications protocol of the message to a first physical communications protocol compatible with the first fuel pump device and the first dedicated channel.

33. The method of claim 32, wherein the first physical communications protocol comprises at least one of a voltage or a current.

34. The method of claim 25, wherein translating comprises translating the message into a command for the first fuel pump device by changing the logical communications protocol of the message to a first logical communications protocol compatible with the first fuel pump device and the first dedicated channel.

35. The method of claim 25, wherein the first logical communications protocol comprises at least one of an RS485, RS232, Current Loop, or TOKHEIM-compatible communications protocol.

36. The method of claim 25, wherein translating comprises translating the message into a command for the first fuel pump device by changing a device address of the message to a first device address compatible with the first fuel pump device and the first dedicated channel.

37. The method of claim 36, wherein the device address comprises a fuel pump number.

38. The method of claim 25, further comprising:

h. determining if tampering has occurred using the sensed open loop voltage.

39. The method of claim 25, wherein each dedicated channel comprises at least one of an RS485, RS232, Current Loop, or TOKHEIM-compatible connection.

40. The method of claim 25, wherein the controller is installed in a fuel pump housing.

* * * * *